No. 617,531. Patented Jan. 10, 1899.
S. HURT.
BALING PRESS.
(Application filed Nov. 27, 1897.)
(No Model.) 2 Sheets—Sheet 1.
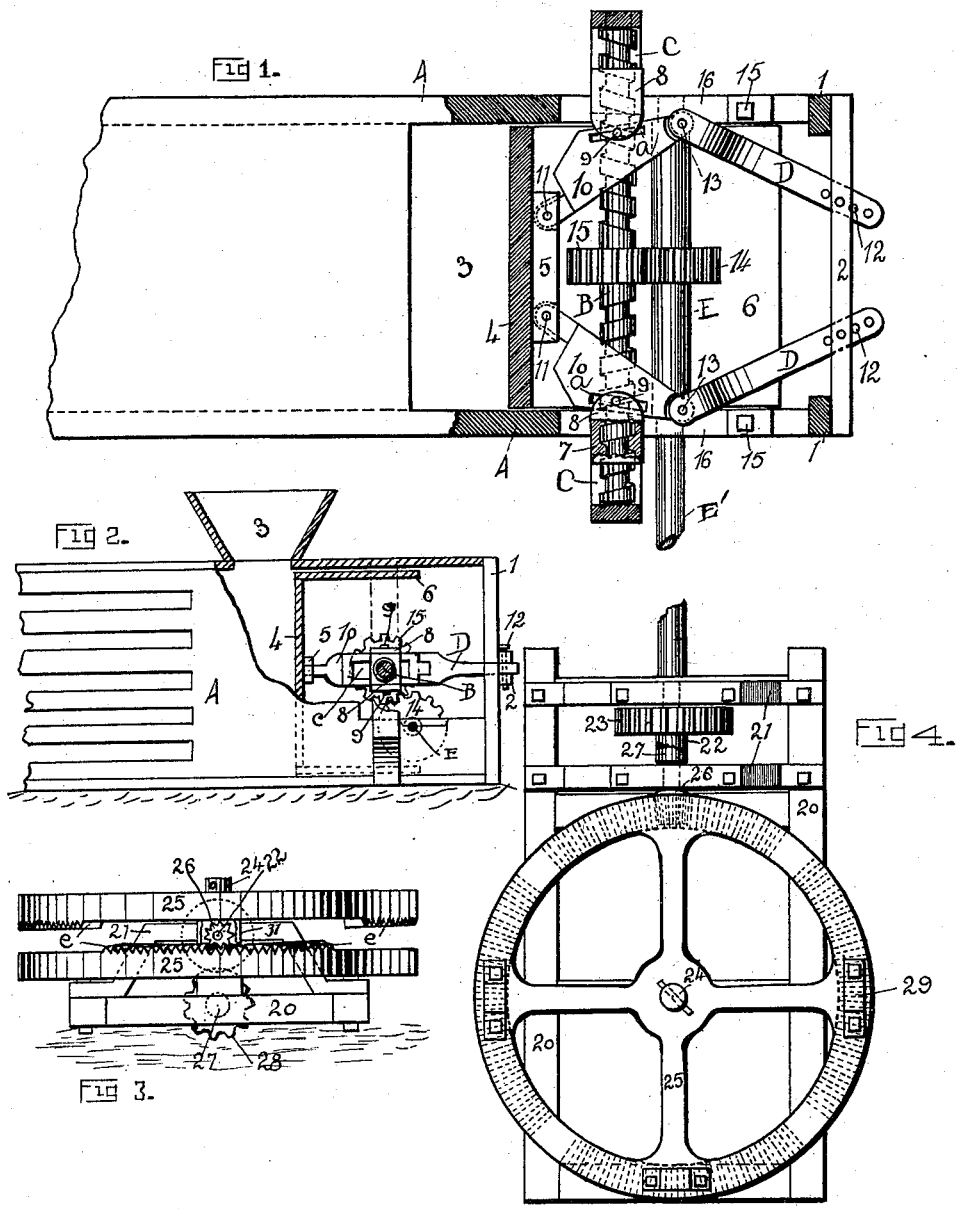
WITNESSES:
D. O. Barnell.
A. M. Elkjer.
INVENTOR
Samuel Hurt
BY G. W. Sues.
ATTORNEY.

No. 617,531. Patented Jan. 10, 1899.
S. HURT.
BALING PRESS.
(Application filed Nov. 27, 1897.)
(No Model.) 2 Sheets—Sheet 2.
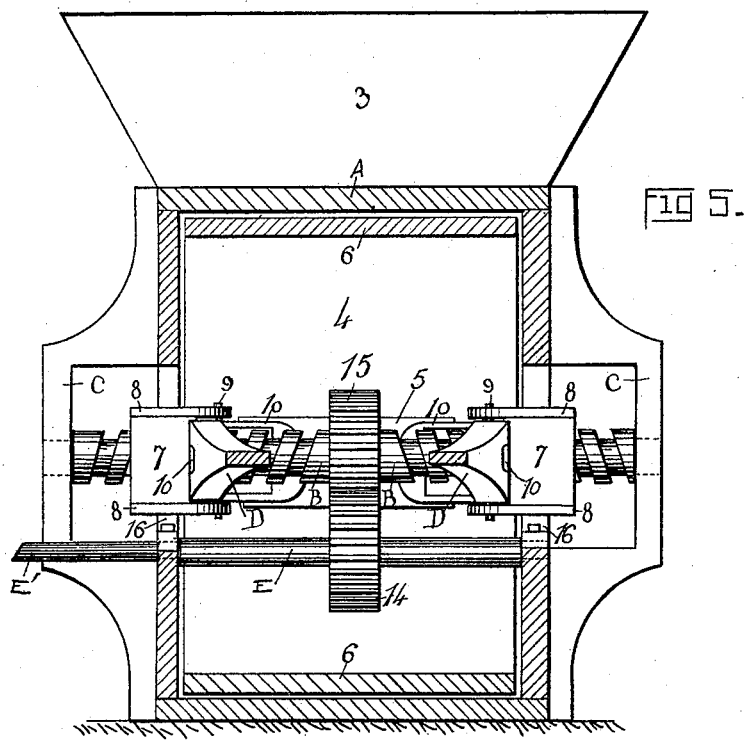
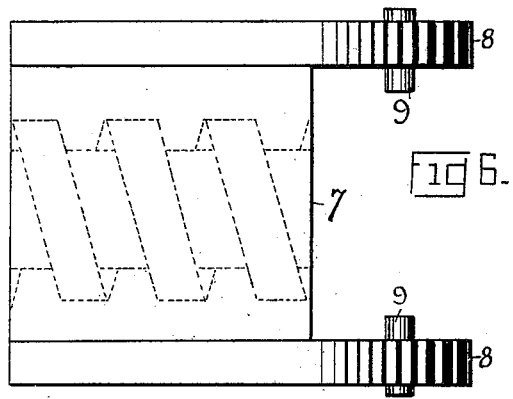
WITNESSES:
D. O. Barnell.
A. M. Elker.
INVENTOR
Samuel Hurt
BY G. W. Sues
ATTORNEY.

UNITED STATES PATENT OFFICE.

SAMUEL HURT, OF COIN, IOWA.

BALING-PRESS.

SPECIFICATION forming part of Letters Patent No. 617,531, dated January 10, 1899.

Application filed November 27, 1897. Serial No. 659,976. (No model.)

*To all whom it may concern:*

Be it known that I, SAMUEL HURT, residing at Coin, in the county of Page and State of Iowa, have invented certain useful Improvements in Baling-Presses; and I do hereby declare that the following is a full, clear, and exact description of the invention, such as will enable others skilled in the art to which it appertains to make and use the same, reference being had to the accompanying drawings, which form a part of this specification.

This invention has relation to an improvement in hay-baling presses.

The object of my invention is to provide a hay-baler which shall be light enough to be transported on an ordinary farm-wagon.

The object of my invention is, further, to provide a hay-baler which may be readily shifted, so as to be brought to any point near the stack, and as the hay is used up the baler proper may be quickly carried over nearer to the stack, so as to save time in carrying the hay from the farthest point of the stack to the baler, it being the intention to provide a baling-press that may be carried toward the stack as the hay is baled.

In the accompanying drawings, Figure 1 shows a top view, with portions broken away and removed, of a baling-press embodying my invention. Fig. 2 shows a side elevation, with portions removed, of the baler. Figs. 3 and 4 show a top and side view, respectively, of the power mechanism as used in my invention. Fig. 5 shows a rear end view, with portions removed, of the baler proper, while Fig. 6 shows an end view of one of the main bearings.

As has been set forth, the object of my invention is more particularly to provide a hay-baler that shall be light enough so that it can be transported in an ordinary farm-wagon and shall be further so constructed that the baler may be shifted toward the stack as the hay is consumed in baling.

In the furtherance of the aim and object of my invention I divide my baler into two sections, the first being the baler proper and the second section comprising the power mechanism. In the accompanying drawings, for instance, I have shown in Figs. 1 and 3, respectively, a top view of the baler and a top view of the power mechanism, which two are connected by means of ordinary coupling-rods provided with universal joints.

My baler proper, for instance, comprises the usual housing A, which upon the rear is open, however, and is provided with the vertical standards 1 1, to which is secured a transverse bar 2, referring now to Fig. 1. Within this housing at a suitable point is positioned the main driving-shaft E, which is provided with a shaft projection E' of a diameter less than the shaft proper. Mounted upon this main driving-shaft E is an ordinary gear 14, which meshes with a gear 15, secured upon the right and left handed screw-shaft B, the gear 15 preferably being in the center of this screw-shaft, the thread upon one side of the gear being right-handed and upon the other a left-handed thread. This screw-shaft at its ends works within suitable brackets C.

Secured to and working upon the screw-shaft are two ordinary threaded boxings 7 7, which are provided with the top plates 8 8, each plate in turn being provided with a downwardly-extending pin 9.

Secured to the plunger-head 4, which head is provided with the top and bottom rearwardly-extending guide-shields 6 6, is a cleat 5, from which cleat pivotally extend the bars 10 10, having a slot *a* within the upper portion thereof, and which bars 10 are slotted, as is shown in Fig. 2, so that the screw-shaft B' readily works within these slotted bars. At their remaining ends these bars 10 are pivotally shackled to the bars D D, which in turn are secured to the support 2 by means of the pins 12, which pass through this support 2 and the bars D.

Now by virtue of the plates 8, which overlap beyond the slots *a*, which slots are within the slotted bars 10, both upon the top and bottom, so that two sets of pins 9 are used for each bar, both the top and bottom pin being shown in Fig. 2, by means of these pins the bearings 7 are held in proper position in conjunction with the top and bottom plates 8. Now should at any time the shaft E be revolved in one direction the threaded bearings 7 will work toward the gear 15, for instance, and so drive the plunger-head 4 forward until, however, the bars 10 come in contact with the gear 15. Then the shaft E must be reversed to carry the screw-shaft in an outward direction, so as to carry the bars outward and bring the plunger-head 4 backward, as is shown in Fig. 1, for instance, so that the screw-shaft B is alternately revolved forward and backward. In order to convert this alternate backward and forward motion into a continuous rotary motion, I provide a power mechanism comprising the lower frame 20, within which is positioned a lower horizontal shaft 27, which is provided with a pinion 28, and an upper stub-shaft 22, provided with a pinion 23, which stub-shaft works within the supporting-brackets 21 and is provided with a pinion 26, which pinion is adapted to engage the upper and lower teeth e of the two mutilated crown-gears 25 25. These two crown-gears are connected by a collar 31, so that they act as an integral part, and the upper and lower teeth-sections e alternately engage the pinion 26 to rotate the same alternately in opposite directions.

The device is simple, there being few parts, and is comparatively light and readily portable.

Having thus described my said invention, what I claim as new, and desire to secure by United States Letters Patent, is—

In a baling-press the combination of the following instrumentalities to wit: the housing A, provided with an open rear end, the main driving-shaft E, extending transversely through and beyond said housing, the gear 14 mounted upon said shaft E, the right and left handed screw-shaft B, the gear 15, upon said screw-shaft to measure with said gear 14, the threaded boxings 7, 7, working upon said screw-shaft upon opposite sides to said pinion 15, the top plates 8, 8, secured to said threaded boxings, the downwardly-extending pins 9, secured to each of said plates 8, the plunger-head 4, working within said housing, and having the rearwardly-extending guides 6, 6, the slotted bars 10, 10, pivotally secured to said plunger-head, said screw-shaft B passing through the slots of said bars, the toggle-bars D, D, pivotally secured to said bars 10, in combination with power mechanism adapted to alternately rotate the shaft E in opposite directions as and for the purpose set forth.

In testimony whereof I affix my signature in presence of two witnesses.

SAMUEL HURT.

Witnesses:
JO. H. FOWLER,
JASPER PRINCE.